3,490,316
CUTTING DEVICE WITH MECHANISM FOR CATCHING WASTE MATERIAL
Bernard Strong, 2552 Benedict Canyon Drive, Beverly Hills, Calif. 90210, and James E. Crawford, 11304 Dona Lola Drive, Studio City, Calif. 91604
Filed Oct. 2, 1967, Ser. No. 673,251
Int. Cl. B23b 41/02, 47/34
U.S. Cl. 77—77                                      4 Claims

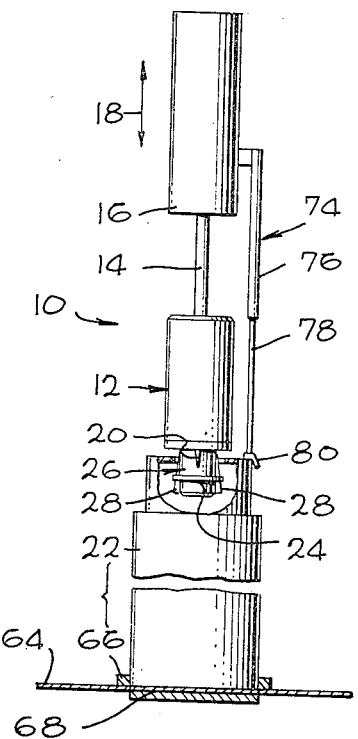
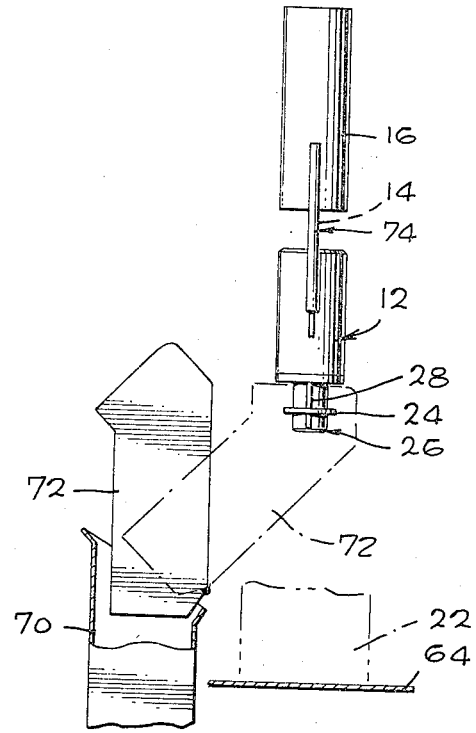
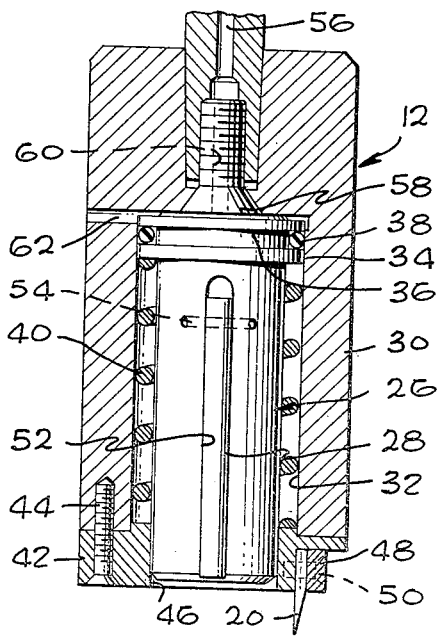
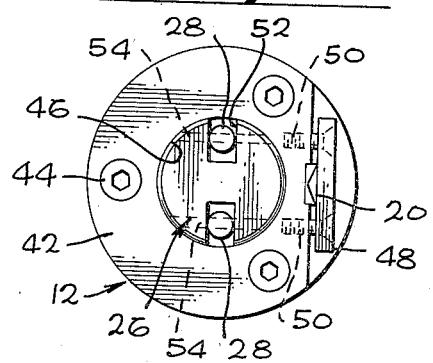
INVENTORS
BERNARD STRONG
JAMES E. CRAWFORD
BY
Warren T. Jessup
ATTORNEY United States Patent Office 3,490,316
Patented Jan. 20, 1970

ABSTRACT OF THE DISCLOSURE

A cutter head of hollow construction, mounted on a rotary shaft, having an air passageway therethrough, the head having a piston slideably mounted therein which is extensible therefrom by the application of pressurized air through the air passageway and has pivoted thereto a pair of retainer arms disposed exteriorly of said head in the extended position of the piston and swinging outwardly in response to centrifugal force during rotation of the cutter head for catching and holding a ring of material cut by a blade on the cutter head.

BACKGROUND OF THE INVENTION

The present invention relates to cutting devices and more particularly to a rotary cutter for enlarging an opening in a plastic container and catching the ring of cut material to prevent dropping thereof into the container.

In the manufacture of plastic containers, the mouth thereof is roughly formed and to fit a closure thereto a ring of the rough material must be rimmed therefrom, trimming machines often being employed in this phase of the manufacturing process to speed fabrication. This ring of waste or excess flash material has, at times, dropped into the container from which retrieval has been difficult and time-consuming, resulting in a slowdown of the manufacturing process.

SUMMARY OF THE INVENTION

It is, therefore, an object of the present invention to provide a cutting device which trims and enlarges an opening and catches the ring of cut material.

Another object of the invention is the provision of a cutting device which cuts a ring of material from around an opening in enlarging the same and catches the ring for withdrawal and disposal.

A further object is to provide a cutting device which cuts an opening of accurate dimensions and automatically catches the waste material for preventing dropping thereof through the opening.

Still another object is the provision of a cutting device which lends itself to cutting a ring of material and catching and disposing of the same, all automatically.

A still further object is to provide a cutting device of fairly simple construction which enlarges an opening in a plastic container by cutting a ring of material from around the opening and removes the ring of material in a rapid, facile manner.

For the achievement of these and other objects and advantages, the present invention contemplates and is concerned with a cutter head of hollow construction mounted on a rotary spindle and containing a movable piston which has a pair of retaining arms pivotally mounted thereon, the piston being spring-urged to a retracted position within the cutter head and extensible therefrom in response to the application of air pressure through an air passageway in the spindle for disposing portions of the retaining arms exteriorly of the cutter for outward pivotal movement thereof due to centrifugal force.

BRIEF DESCRIPTION OF THE DRAWING

FIGURE 1 is a schematic view illustrating a cutting device embodying the principles of the present invention and its relation to a container from which a ring of material is cut;

FIGURE 2 is a side view of the arrangement in FIGURE 1, but also schematically showing apparatus for receiving and disposing of the ring of cut material;

FIGURE 3 is a detail sectional view, on a larger scale, of the head of the cutting device of the present invention; and FIGURE 4 is a bottom plan view of the cutter head of FIGURE 3.

DESCRIPTION OF THE EMBODIMENT

Referring now to the drawing, there is shown in FIGURE 1 a schematic illustration of a cutting device embodying the principles of the present invention, designated generally by reference numeral 10 and including a cutter head 12 secured to a rotatively driven shaft or spindle 14 carried by a support 16 suitably mounted for reciprocal vertical movement, as indicated by the double-headed arrow 18. The cutter head 12 is thus adapted to be advanced to place a blade 20 carried thereby in cutting relation to a container 22 having a roughly-formed mouth opening which is trimmed and enlarged by cutting a ring of material 24 from around the opening in order that a closure may be fitted thereto. Slideably mounted within the cutter head 12, and extensible therefrom, is a piston 26 on which a pair of elongated retaining arms 28 are pivotally mounted, the arms swinging outwardly during rotation, in response to centrifugal force, to catch and hold the cut ring of material 24. The cutter head 12, while still spinning, is then retracted and the cut ring of material is withdrawn from the container for appropriate disposition.

Turning now to FIGURES 3 and 4, it will be seen that the cutter head 12 includes a hollow, cup-like body 30 having a bore 32 within which the piston 26 is disposed. Piston 26 is provided with a head portion 34 slideably fitted in the bore 32 and having an annular groove 36 in which an O-ring seal 38 is received. Surrounding the piston 26 is a coiled compression spring 40 which at one end thereof bears against the piston head portion 34 and at its other end bears against an end plate 42, suitably secured to the body 30, as by screws 44 or the like, the end plate having an aperture 46 in which the piston 26 is slideably fitted. Blade 20 is adjustably clamped to the end plate 42 by a clamp bar 48 and a pair of screws 50.

Piston 26 is suitably slotted, as at 52, to receive retainer arms 28 which are suitably pivoted to the piston, as by pins 54 or the like. When the piston is extended against the bias of spring 40, pivotally-mounted arms 28 respond to centrifugal force during rotation and swing outwardly from the axis of rotation to catch and hold the ring of material cut by blade 20. Extension of the piston is achieved by introducing pressurized air to the head portion 34 of the piston, for which purpose spindle 14 is provided with an air passageway 56 suitably connected to a source of air under pressure and is secured to body 30 by an attaching screw 58 having a passageway 60 therethrough in communication with passageway 56 and bore 32. Aperture 62 provides for bleed-off of the pressurized air so that after the supply thereof has been cut off, the piston 26 is retracted to normal position within body 30 under the bias of spring 40, during which retraction the retainer arms 28 are cammed back into slots 52 by the sidewalls of aperture 46 and the cut ring of material 24 is daffed.

OPERATION

In the operation of the cutting device of the present invention, the container 22 is properly positioned under the cutter head 12 which is then advanced to perform the cutting operation and pressurized air is applied to extend the piston 26 and free the retainer arms 28 for movement outwardly in response to centrifugal force to catch and hold the ring of material 24 cut by the blade 20. While still rotating, the cutter head is retracted and withdrawn from the container carrying with it the ring of cut material. After the supply of air is cut off, the air over the piston bleeds off through opening 62 and piston 62 is retracted with arms 28 being cammed back into slots 52 and the cut ring of material being daffed.

If desired, the containers 22 may be brought into position by a conveyor belt 64, or the like, arranged to operate in a stop-and-go fashion, with chocks or cleats 66 for holding the containers thereon and riding over a pedestal or platform 68 on which each container rests when in place under the cutter head (FIGURE 1). Referring to FIGURE 2, between cutting operations the cut ring of material 24 may be daffed into a disposal chute 70, having a pivoted portion 72 which is adapted to be swung to a position (dotted line) to receive the daffed ring, which position is timed to be taken after the container from which the ring was cut has departed and the next container has not yet arrived under the cutter head. Proper timing of the application of air may be effected by use of a feeler 74, or other pressure transmitting means, which may have telescoping parts 76, 78 to provide adjustability and a foot element 80 engageable with the container, the feeler actuating a valve when the cutter head is properly positioned relative to the container. It is understood, of course, that the bleed-off aperture 62, the amount of air in bore 32 and its pressure, may be dimensioned to provide sufficient time to dispose of the cut ring after cut-off of the air supply. It will also be appreciated that the actions of the several parts may be coordinated and conditioned by interlocking mechanisms known in the art to perform the same automatically.

There has thus been provided a cutting device with a mechanism for catching waste material automatically which is simple and economical in construction and operates in a rapid, facile and reliable manner to trim and enlarge openings and dispose of the ring of cut material.

Although the present invention has been described herein in what is conceived to be the best mode contemplated, it is recognized that departures may be made therefrom within the scope of the invention, which is, therefore, not to be limited to the details disclosed herein, but is to be afforded the full scope of the invention as hereinafter claimed.

What is claimed is:

1. In a device for enlarging an opening formed in material, in combination:
   rotatable means;
   cutting means carried by said rotatable means operative to cut a ring of material from around said opening during rotation; and
   retaining means carried by said rotatable means operative to catch and hold said ring of material, said retaining means being extensible relative to said cutting means and including means responsive to centrifugal force when said retaining means are extended, said means responsive to centrifugal force including means pivotally mounted on means slidable relative to said rotatable means, and said pivotally mounted means comprising elongated arms, said slidable means comprising a piston biased to dispose said arms within said rotatable means, and means operative to slide said piston to dispose a portion of said arms outwardly of said rotatable means; whereby during rotation said arms swing outwardly due to centrifugal force for catching and holding said ring of material.

2. The combination defined in claim 1, wherein said last-named means is pneumatically operated.

3. A cutting device comprising, in combination:
   rotatable means;
   cutting means carried by said rotatable means;
   slidable means within said rotatable means and extensible therefrom, said slidable means comprising a piston; and
   movable means comprising a pair of arms pivotally mounted on said piston carried by said slidable means and responsive to centrifugal force when said slidable means is extended from said rotatable means.

4. The device of claim 3, wherein said piston is extended by pneumatic means.

References Cited

UNITED STATES PATENTS

| | | | |
|---|---|---|---|
| 485,715 | 11/1892 | Smith | 77—42 |
| 1,045,289 | 11/1912 | Hill | 77—42 |
| 2,972,915 | 2/1961 | Milanovits et al. | 77—42 |
| 3,391,588 | 7/1968 | Brown | 77—77 XR |

FRANCIS S. HUSAR, Primary Examiner

U.S. Cl. X.R.

30—310; 77—42; 145—121